US008022128B2

United States Patent
Youn et al.

(10) Patent No.: US 8,022,128 B2
(45) Date of Patent: Sep. 20, 2011

(54) THERMOPLASTIC ELASTOMER COMPOSITION

(75) Inventors: Bum Seok Youn, Uiwang-si (KR); Lee Kun Cho, Uiwang-si (KR); Young Sik Ryu, Uiwang-si (KR); Chang Min Hong, Uiwang-si (KR); Young Sil Lee, Uiwang-si (KR); Young Jun Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/633,875

(22) Filed: Dec. 9, 2009

(65) Prior Publication Data
US 2010/0152320 A1   Jun. 17, 2010

(30) Foreign Application Priority Data
Dec. 12, 2008   (KR) .............................. 2008-126342

(51) Int. Cl.
*C08K 3/04* (2006.01)
*C08K 3/08* (2006.01)
*C08K 3/10* (2006.01)
*C08K 3/20* (2006.01)
*C08K 3/34* (2006.01)
*C08K 5/21* (2006.01)
*C08L 53/00* (2006.01)

(52) U.S. Cl. ........ 524/403; 524/426; 524/440; 524/445; 524/449; 524/451; 524/456; 524/474; 524/505

(58) Field of Classification Search .................. 523/122; 524/403, 426, 440, 445, 449, 451, 456, 474, 524/505
See application file for complete search history.

(56) References Cited

U.S. PATENT DOCUMENTS

| 7,851,559 | B2 * | 12/2010 | Lee ............................. 525/333.3 |
| 2004/0041347 | A1 | 3/2004 | Beach et al. |
| 2004/0151933 | A1 * | 8/2004 | Ajbani et al. ................. 428/515 |
| 2005/0288393 | A1 | 12/2005 | Lean et al. |
| 2009/0124743 | A1 * | 5/2009 | Lee ............................. 524/414 |
| 2009/0137716 | A1 | 5/2009 | Furukawa et al. |
| 2009/0283973 | A1 | 11/2009 | Koh et al. |

FOREIGN PATENT DOCUMENTS

| EP | 2123708 A1 | 11/2009 |
| JP | 2002-338779 A | 11/2002 |
| JP | 2005-132922 A | 5/2005 |
| WO | 2006/080560 A1 | 8/2006 |

OTHER PUBLICATIONS

Extended European Search Report in counterpart European Application No. 09178516.2-2109, dated Mar. 18, 2010.

* cited by examiner

*Primary Examiner* — Kriellion A Sanders
(74) *Attorney, Agent, or Firm* — Summa, Additon & Ashe, P.A.

(57) ABSTRACT

A thermoplastic elastomer composition comprises (A) about 25 to about 55 parts by weight of a block terpolymer including an aromatic vinyl compound and an alkene compound; (B) about 20 to about 50 parts by weight of a paraffin oil; (C) about 5 to about 15 parts by weight of a polyolefin resin; (D) about 5 to about 20 parts by weight of an inorganic additive; and (E) about 3 to about 15 parts by weight of a polyphenylene ether. The thermoplastic elastomer composition can have excellent physical properties, such as flexibility (or resilience), surface hardness, and restoring force at high temperatures.

15 Claims, 1 Drawing Sheet

THERMOPLASTIC ELASTOMER COMPOSITION

CROSS REFERENCE TO RELATED APPLICATION

This application claim priority from Korean Patent Application No. 2008-0126342, filed on Dec. 12, 2008 in the Korean Intellectual Property Office, the disclosure of which is incorporated herein by reference in its entirety.

FIELD OF THE INVENTION

The present invention relates to a thermoplastic elastomer composition.

BACKGROUND OF THE INVENTION

Thermoplastic elastomers (TPE) have rubber elasticity like vulcanizable rubber at room temperature yet also have properties intermediate rubber and plastic, i.e., exhibit properties of both vulcanizable rubber and plastic materials. Thermoplastic elastomers also can be injection-molded like a plastic material at high temperatures.

Due to these properties, thermoplastic elastomers can be used in various products that require resilience, such as sports equipment, food packaging, medical equipment, the exterior of portable IT devices, and home appliances, among others. In addition, because products formed of thermoplastic elastomers can be injection molded (in contrast to vulcanizable rubber), manufacturing times can be shortened. Further, products formed of thermoplastic elastomers can be recycled, also in contrast to vulcanizable rubber, and thus can be environmentally advantageous.

However, thermoplastic elastomers can have poor physical properties (such as elongation permanent set) at high temperatures and can have poor surface hardness (of 50A shore A) as compared to vulcanizable rubber products. This can limit the products in which thermoplastic elastomers can be used.

In order to overcome these limitations, thermoplastic elastomers have been alloyed with other resins. However, the thermoplastic elastomer still does not satisfy desired thermal properties at high temperatures and further can lose surface flexibility, which is an inherent advantage of TPEs.

US Patent Publication No. 2005/0288393 discloses a thermoplastic elastomer composition including thermoplastic resin, block copolymer, core-shell copolymer, and oil. However, the composition is not suitable for use for electric and electronic parts, in particular, a diaphragm for a washing machine, because the surface hardness (shore A) exceeds 70.

US Patent Publication 2004/0151933 discloses a thermoplastic elastomer composition including thermoplastic resin, rubber elastomer, saturated elastomer, and oil. The thermoplastic elastomer, however, cannot maintain a surface hardness of 50A (shore A) and its uses are also limited.

SUMMARY OF THE INVENTION

The present invention provides a thermoplastic elastomer composition including a block terpolymer including an aromatic vinyl compound and an alkene compound, paraffin oil, polyolefin-based resin, inorganic additive, and polyphenylene ether. The thermoplastic elastomer composition of the invention can have excellent physical properties and elasticity at room temperature and high temperatures. The thermoplastic elastomer composition of the present invention can also maintain a surface hardness of about 50A (shore A) or less, for example a Shore A hardness of about 0.1 to about 50A. The thermoplastic elastomer composition of the present invent can further have excellent workability, thermal resistance, chemical resistance, and wear resistance. The thermoplastic elastomer composition can be used to manufacture various molded products requiring excellent flexibility (or resiliency), such as electric and electronic parts, car parts, and the like.

The present invention further provides molded products including the thermoplastic elastomer composition, such as a diaphragm for a washing machine The thermoplastic elastomer composition of the present invention can include (A) about 25 to about 55 parts by weight of a block terpolymer including an aromatic vinyl compound and an alkene compound; (B) about 20 to about 50 parts by weight of a paraffin oil; (C) about 5 to about 15 parts by weight of a polyolefin-based resin; (D) about 5 to about 20 parts by weight of an inorganic additive; and (E) about 3 to about 15 parts by weight of a polyphenylene ether.

In an exemplary embodiment of the invention, the terpolymer (A) can be an A-B-A' type, wherein each of the A and A' blocks are hard segments and the B block is a soft segment. The terpolymer (A) can include the hard segments in an amount of about 20 to about 35% by weight and the soft segment in an amount of about 65 to about 80% by weight. In another exemplary embodiment, the A and A' blocks each comprise an aromatic vinyl polymer and the B block comprises a conjugated diene polymer.

Examples of the terpolymer (A) may include without limitation styrene-ethylene butadiene-styrene (SEBS) block copolymer, styrene-ethylene propylene-styrene (SEPS) block copolymer, styrene-isoprene-styrene (SIS) block copolymer, styrene-ethylene isoprene-styrene block copolymer, styrene-ethylene ethylene propylene-styrene (SEEPS) block copolymer, and the like, and combinations thereof. In an exemplary embodiment, the terpolymer (A) can have a weight average molecular weight of about 140,000 to about 180,000.

The paraffin oil (B) may have a kinematic viscosity of about 95 to about 215 cst (40° C. as a reference).

In an exemplary embodiment, the polyolefin-based resin (C) may have melt index (230° C., 2.16 kg) of about 11 to about 25 g/10 min. Examples of the polyolefin-based resin may include without limitation polyethylene, polypropylene, polybutylene, ethylene-propylene copolymer and the like, and combinations thereof.

In an exemplary embodiment, the inorganic additive (D) can have a particle size of about 0.01 to about 5μm. Examples of the inorganic additive may include without limitation calcium carbonate, talc, clay, silica, mica, titanium dioxide, carbon black, graphite, wollastonite, nano silver and the like, and combinations thereof.

In an exemplary embodiment, the polyphenylene ether resin can have a weight average molecular weight of about 20,000 to about 40,000.

In an exemplary embodiment, the thermoplastic elastomer composition can have a surface hardness of about 50A (shore A) or less, for example a Shore A hardness of about 0.1 to about 50A. The thermoplastic elastomer composition can have an elongation permanent set (100° C.) measured in accordance with KS M 6518 using a 3 dumbbell type sample of about 20% or less, for example about 0.1 to about 15%, and as another example about 5 to about 13%.

The thermoplastic elastomer composition of the present invention may further include an additive selected from UV absorbents, heat stabilizers, antioxidants, flame retardants, lubricants, colorants, antimicrobial agents, and the like, and combinations thereof.

Another aspect of the present invention provides a molded article produced from the thermoplastic elastomer, for example a diaphragm for a washing machine Another aspect of the present invention provides a thermoplastic elastomer including (A) a terpolymer including styrene-ethylene butadiene-styrene (SEBS) block copolymer, styrene-ethylene propylene-styrene (SEPS) block copolymer, styrene-isoprene-styrene (SIS) block copolymer, styrene-ethylene isoprene-styrene block copolymer, styrene-ethylene ethylene propylene-styrene (SEEPS) block copolymer, or a combination thereof; (B) a paraffin oil (C) a polyolefin-based resin including polyethylene, polypropylene, polybutylene, ethylene-propylene copolymer, or a combination thereof; (D) an inorganic additive including calcium carbonate, talc, or a combination thereof; and (E) a polyphenylene ether. The thermoplastic elastomer can have a surface hardness of 50A (shore A) or less, for example a Shore A hardness of about 0.1 to about 50A. The thermoplastic elastomer can have a tensile strength (100° C.) measured in accordance with KS M 6518 using a 3 dumbbell type sample of about 14 to about 25 kgf/cm², an elongation rate (100° C.) measured in accordance with KS M 6518 using a 3 dumbbell type sample of about 430 to about 700%, and an elongation permanent set (100° C.) measured in accordance with KS M 6518 using a 3 dumbbell type sample of about 5 to about 13%.

DETAILED DESCRIPTION OF THE INVENTION

Figure 1:
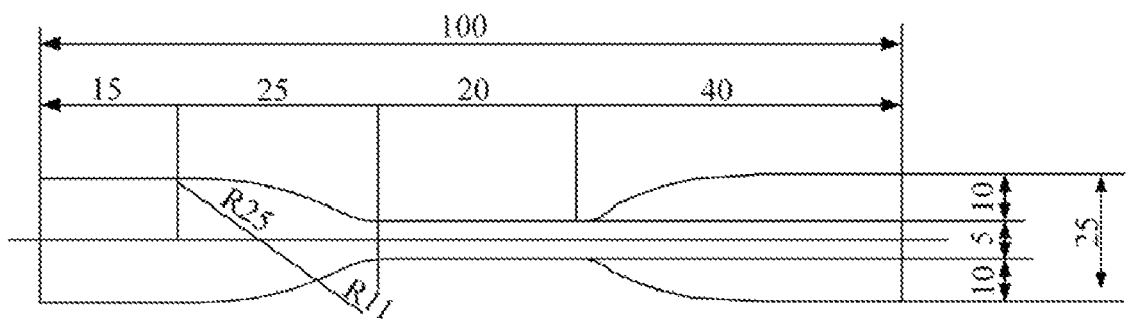
FIG. 1 illustrates a 3 dumbbell type sample in accordance with KS M 6518 (unit: mm, thickness: 2~3 mm).

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

(A) Block Terpolymer of Aromatic Vinyl Compound and Alkene Compound

The terpolymer used in the present invention can provide the surface flexibility property of a thermoplastic elastomer.

In an exemplary embodiment of the invention, the terpolymer (A) is an A-B-A' type, wherein each of the A and A' blocks are hard segments and the B block is a soft segment. The hard segment can prevent thermoplastic deformation and the soft segment can exhibit elastomer property. Various properties, such as hardness, heat resistance, chemical resistance, and wear resistance, among others, according to the type, content, molecular weight, and arrangement of the hard segment and the soft segment, can be provided. In an exemplary embodiment, the terpolymer (A) can include a hard segment in an amount of about 20 to about 35% by weight and the soft segment in an amount of about 65 to about 80% by weight. In another exemplary embodiment, the A and A' blocks can each include an aromatic vinyl polymer. In this embodiment, the terpolymer can include the hard segments in an amount of about 27 to about 35% by weight and the soft segment in an amount of about 65 to about 73% by weight.

In an exemplary embodiment, the A and A' blocks can each include an aromatic vinyl polymer and the B block can include a conjugated diene polymer. For example, the A and A' block each can be a styrene polymer and the B block can be ethylene-butadiene, isoprene, ethylene-isoprene, ethylene-propylene polymer, or a combination thereof.

Examples of the terpolymer may include, but are not limited to, styrene-ethylene butadiene-styrene (SEBS) block copolymer, styrene-ethylene propylene-styrene (SEPS) block copolymer, styrene-isoprene-styrene (SIS) block copolymer, styrene-ethylene isoprene-styrene block copolymer, styrene-ethylene ethylene propylene-styrene (SEEPS) block copolymer and the like, and combinations thereof. The terpolymer can be used singly or as a combination thereof.

In an exemplary embodiment, the terpolymer (A) can have a weight average molecular weight of about 140,000 to about 180,000, for example about 147,000 to about 180,000.

The thermoplastic elastomer composition of the present invention can include the terpolymer (A) in an amount of about 25 to about 55 parts by weight, for example about 27 to about 45 parts by weight, and as another example about 30 to about 40 parts by weight, based on the total weight of the elastomer composition. When the terpolymer is used in an amount within the above-mentioned range, the composition can exhibit excellent mechanical and flexibility properties.

(B) Paraffin Oil

The paraffin oil used in the present invention can act as a softener of the thermoplastic rubber and can improve elongation.

In an exemplary embodiment, the paraffin oil can have a weight average molecular weight of about 400 to about 1,200, for example about 600 to about 900.

In another exemplary embodiment, the paraffin oil may have a kinematic viscosity of about 95 to about 215 cst (40° C. as a reference temperature), for example about 100 to about 210.5 cst (40° C. as a reference temperature).

In another exemplary embodiment, the paraffin oil may have a specific gravity [15/4° C.] of 0.75 to 0.95, a flash point of about 250° C. to about 330° C., and a pour point of about −25° C. to about −5° C. For example, the paraffin oil may have a specific gravity [15/4° C.] of about 0.85 to about 0.90, a flash point of about 270° C. to about 300° C., and a pour point of about −18° C. to about −9° C.

The thermoplastic elastomer composition of the present invention may include the paraffin oil in an amount of about 20 to about 50 parts by weight, for example about 30 to about 45 parts by weight, and as another example about 35 to about 42 parts by weight, based on the total weight of the elastomer composition. When the thermoplastic elastomer composition includes paraffin oil in an amount in the above-mentioned range, the composition can exhibit excellent elongation rate, workability, and balance of properties.

(C) Polyolefin-Based Resin

The polyolefin-based resin used in the present invention can improve mechanical properties of thermoplastic elastomer and workability when the composition is injection molded. Various properties of thermoplastic elastomer can be provided according to the type, molecular weight, density, melt index, mechanical property, and the like.

In an exemplary embodiment, the polyolefin-based resin may have a melt index (230° C., 2.16 kg) of about 11 to about 25 g/10 min, for example about 15 to about 23 g/10 min.

In another exemplary embodiment, the polyolefin-based resin may have a density of about 0.85 to about 1.1 g/cm³. In another exemplary embodiment, the polyolefin-based resin may have a tensile strength (yield point, 50 mm/min) of about 300 to about 380 kg/cm².

Examples of the polyolefin-based resin may include, but are not limited to, polyethylene, polypropylene, polybutylene, ethylene-propylene copolymer and the like, and combinations thereof. The polyolefin-based resin can be used singly or as a combination thereof.

The structure of the polyolefin is not limited and can be atactic, isotactic, or syndiotactic.

The thermoplastic elastomer composition of the present invention can include the polyolefin-based resin in an amount of about 5 to about 15 parts by weight, for example about 6 to about 12 parts by weight, and as another example about 7 to about 11 parts by weight, based on the total weight of the elastomer composition. When the thermoplastic elastomer composition includes the polyolefin-based resin in an amount in the above-mentioned range, the thermoplastic elastomer composition can exhibit excellent mechanical properties, workability, and balance of properties.

(D) Inorganic Additive

The inorganic additive used in the present invention can improve the workability of the thermoplastic elastomer.

The inorganic additive can be a particle type, a fiber type, or a combination thereof. When the inorganic additive is a particle type, the average diameter of the particles of the inorganic additive can be about 0.01 to about 5 μm.

Examples of the inorganic additive may include, but are not limited to, calcium carbonate, talc, clay, silica, mica, titanium dioxide, carbon black, graphite, wollastonite, nano silver and the like, and combinations thereof. The inorganic additive can be used singly or as a combination thereof.

The inorganic additive may be coated with a surface treating agent such as a coupling agent or it may be added as is without being coated.

The thermoplastic elastomer composition of the present invention can include the inorganic additive in an amount of about 5 to about 20 parts by weight, for example about 10 to about 17 parts by weight, and as another example about 10.5 to about 15 parts by weight, based on the total weight of the elastomer composition. When the thermoplastic elastomer composition includes the inorganic additive in an amount in the above-mentioned range, the thermoplastic elastomer composition can exhibit excellent mechanical properties, workability, and balance of properties.

(E) Polyphenylene Ether Resin

In the present invention, polyphenylene ether can improve physical properties, such as restoring force, of the thermoplastic elastomer at high temperatures.

Examples of the polyphenylene ether resin may include, but are not limited to, poly(2,6-dimethyl-1,4-phenylene) ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, poly(2,6-diphenyl-1,4-phenylene)ether, copolymer of poly(2,6-dimethyl-1,4-phenylene)ether and poly(2,3,6-trimethyl-1,4-phenylene) ether, copolymer of poly(2,6-dimethyl-1,4-phenylene)ether and poly(2,3,6-triethyl-1,4-phenylene)ether, and the like, and combinations thereof.

In the present invention, the degree of polymerization of the polyphenylene ether is not particularly limited. The polyphenylene ether can have an intrinsic viscosity measured in chloroform solvent at 25° C. of about 0.2 to about 0.8 g/dL, taking into account the thermal stability or workability of the resin composition.

In an exemplary embodiment, the polyphenylene ether resin can have a weight average molecular weight of about 20,000 to about 40,000. When the weight average molecular weight of the polyphenylene ether resin is in the above-mentioned range, the composition can exhibit an excellent balance of properties.

The molecular weight and content of the polyphenylene ether may be determined according to the molecular weight and content of the aromatic vinyl compound (such as styrene) that is the hard segment of the terpolymer. The thermoplastic elastomer composition of the present invention can include the polyphenylene ether in an amount of about 3 to about 15 parts by weight, for example about 3 to about 11 parts by weight, as another example about 3 to about 10 parts by weight, as another example about 7 to about 11 parts by weight, and as another example about 7.5 to about 11 parts by weight, based on the total weight of the thermoplastic elastomer composition. When the thermoplastic elastomer composition includes the polyphenylene ether in an amount in the above-mentioned range, the thermoplastic elastomer composition can exhibit excellent mechanical properties and restoring force at a high temperature. When the polyphenylene ether exceeds about 15 parts by weight, workability may be deteriorated.

The thermoplastic elastomer composition of the present invention can have a surface hardness of about 50A (shore A) or less, for example a Shore A hardness of about 0.1 to about 50A. The thermoplastic elastomer composition can also have an elongation permanent set (100° C.) measured in accordance with KS M 6518 using a 3 dumbbell type sample of about 20% or less, for example about 0.1 to about 15%, and as another example about 5 to about 13%.

Another aspect of the present invention provides a thermoplastic elastomer. The thermoplastic elastomer comprises (A) a terpolymer including styrene-ethylene butadiene-styrene (SEBS) block copolymer, styrene-ethylene propylene-styrene (SEPS) block copolymer, styrene-isoprene-styrene (SIS) block copolymer, styrene-ethylene isoprene-styrene block copolymer, styrene-ethylene ethylene propylene-styrene (SEEPS) block copolymer, or a combination thereof; (B) a paraffin oil (C) a polyolefin-based resin including polyethylene, polypropylene, polybutylene, ethylene-propylene copolymer, or a combination thereof; (D) an inorganic additive including calcium carbonate, talc, or a combination thereof; and (E) a polyphenylene ether. The thermoplastic elastomer can have a surface hardness of about 50A (shore A) or less, for example a Shore A hardness of about 0.1 to about 50A. The thermoplastic elastomer can further have a tensile strength) (100° measured in accordance with KS M 6518 using a 3 dumbbell type sample of about 14 to about 25 $kgf/cm^2$, an elongation rate)(100° measured in accordance with KS M 6518 using a 3 dumbbell type sample about 430 to about 700%, and an elongation permanent set (100° C.) measured in accordance with KS M 6518 using a 3 dumbbell type samples of about 5 to about 13%.

Each component of the thermoplastic elastomer is the same as the components of the thermoplastic elastomer composition.

The thermoplastic elastomer composition of the present invention may further include one or more additives depending on its use. Examples of the additive may include, but are not limited to, UV absorbents, light-stabilizer, flame retardants, lubricants, colorants, antimicrobial agents and the like, and combinations thereof. The additives can be used singly or as a combination thereof. The thermoplastic elastomer composition can include the additive in an amount of about 30 parts by weight or less, based on about 100 parts by weight of the thermoplastic elastomer composition. Exemplary antioxidants can include without limitation phenols, phosphides, thioethers, amines, and the like, and combinations thereof.

The thermoplastic elastomer composition of the present invention can be prepared by a conventional method. For example, all the components and optionally additive(s) can be mixed together and extruded through an extruder and can be prepared in the form of pellets. The pellets may be molded into various molded articles by using molding methods such as extrusion, injection, vacuum molding, casting molding and the like, but are not limited to these methods.

The thermoplastic elastomer composition having the above-mentioned composition can maintain a surface hardness of about 50A (shore A) or less, for example a Shore A hardness of about 0.1 to about 50A, and can have excellent physical properties (such as elongation permanent set) and restoring force at room temperature and a high temperature, such that it can be used to manufacture various molded products, such as electric and electronic parts, car parts, and the like, that require flexibility. The thermoplastic elastomer composition can be used, for example, in a diaphragm for a washing machine.

The invention may be better understood by reference to the following examples which are intended for the purpose of illustration and are not to be construed as in any way limiting the scope of the present invention, which is defined in the claims appended hereto.

EXAMPLES

The components used to prepare the thermoplastic elastomer composition in Examples 1 to 3 and Comparative Examples 1 to 5 are as follows (A) Terpolymer A terpolymer (product name: G1651) manufactured by Claiton Co., having a hard segment of styrene in an amount of 33 parts by weight and a soft segment of ethylene butadiene in an amount of 67 parts by weight, and a weight average molecular weight of about 150,000, is used.

(B) Paraffin Oil

A KL-1100 (product name) manufactured by Sujin Chemical Co. is used.

(C) Polyolefin-Based Resin

A polypropylene (product name: HJ-700) manufactured by Samsung Total is used.

(D) Inorganic Additive

A calcium carbonate (product name: Omiya 2-HB) manufactured by Omiya Co. with an average particle size of 2 μm is used.

(E) Polyphenylene Ether

A polyphenylene ether with a weight average molecular weight of about 25,000 to about 30,000 g/mol is used.

Examples 1 to 3 and Comparative Examples 1 to 5

The components as shown in the following table 1 are mixed for 25 minutes at a fixed temperature of 240° C. and 40 rpm using a banbury mixer, and the mixture is extruded under conditions of a fixed temperature of 240° C., a screw rotating speed of 300 rpm, and a self supplying speed of 25 rpm using a twin screw extruder having L/D=24 and Φ=45 mm to prepare pellets. The prepared pellets are dried at 60° C. for 4 hours and molded into test specimens for evaluating properties in a 10 oz injection molding machine at about 180 to about 280° C. The properties are measured in accordance with the following methods. The results are shown in Table 1.

Methods for Evaluating Properties (1) Hardness: Shore A Hardness is measured in accordance with KS M 6518.

(2) Tensile strength: Tensile strength is measured in accordance with KS M 6518 using a 3 dumbbell type sample at 25° C. and 100° C., respectively.

(3) Elongation rate: Elongation rate is measured in accordance with KS M 6518 using a 3 dumbbell type sample at 25° C. and 100° C., respectively.

(4) Elongation permanent set: Elongation permanent set is measured in accordance with KS M 6518 using a 3 dumbbell type sample at 25° C. and 100° C., respectively.

For ease of reference, a FIGURE of a 3 dumbbell type sample in accordance with KS M 6518 (unit: mm, thickness: 2~3 mm) is shown in FIG. 1.

TABLE 1

|  | Examples | | | Comparative Examples | | | | |
|---|---|---|---|---|---|---|---|---|
|  | 1 | 2 | 3 | 1 | 2 | 3 | 4 | 5 |
| (A) Terpolymer | 45 | 30 | 40 | 45 | 48 | 30 | 30 | 30 |
| (B) Paraffin oil | 30 | 39 | 25 | 35 | 30 | 32 | 30 | 25 |
| (C) Polyolefin-based resin | 10 | 9 | 10 | 10 | 10 | 8 | 20 | 10 |
| (D) Inorganic additive | 10 | 13 | 10 | 10 | 10 | 13 | 8 | 25 |
| (E) Polyphenylene ether resin | 5 | 9 | 15 | — | 2 | 17 | 12 | 10 |
| Hardness (Shore A) | 48 | 41 | 49 | 47 | 42 | 41 | 67 | 52 |
| 25° C. Tensile Strength (kgf/cm$^2$) | 40 | 78 | 70 | 40 | 67 | 60 | 115 | 35 |
| Elongation rate (%) | 750 | 1100 | 650 | 750 | 700 | 750 | 800 | 450 |
| Elongation permanent Set (%) | 4.0 | 2.2 | 2.6 | 4.0 | 3.0 | 3.5 | 7.0 | 6.0 |
| 100° C. Tensile Strength (kgf/cm$^2$) | 14 | 21 | 20 | 8 | 13 | 19 | 35 | 8 |
| Elongation rate (%) | 430 | 700 | 500 | 400 | 300 | 500 | 500 | 350 |
| Elongation permanent Set (%) | 12 | 6.3 | 6.0 | 75 | 25 | 7.0 | 15 | 20 |

As shown in Table 1, the thermoplastic elastomer composition of Examples 1 to 3 maintains a surface hardness of 50A (shore A) or less and has excellent physical properties (such as elongation permanent set) at room temperature and a high temperature, as compared to Comparative Examples 1 to 5. Comparing Example 1 with Comparative Example 1, Example 1 including polyphenylene ether has better physical properties at a high temperature (100° C.) than Comparative Example 1. As shown in Comparative Example 2, when polyphenylene ether is used in an amount of 2% or less, the elongation permanent reduction rate is not excellent, and as shown in Comparative Example 3, when polyphenylene ether is used in an amount of 15% or more, the physical properties are deteriorated and the elongation permanent reduction rate is not excellent. In Comparative Examples 4 and 5, hardness exceeds 50A (shore A) when the polyolefin-based resin is used in an amount of 20% and the inorganic additive is used in an amount of 25%.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic elastomer composition comprising:
   (A) about 25 to about 55 parts by weight of block terpolymer including an aromatic vinyl compound and an alkene compound, wherein said block terpolymer (A) is a A-B-A' block terpolymer, wherein each of the A and A' blocks are a hard segment, the B block is a soft segment, and the terpolymer comprises the hard segments in an amount of about 20 to about 35% by weight and the soft segment in an amount of about 65 to about 80% by weight;
   (B) about 20 to about 50 parts by weight of a paraffin oil;
   (C) about 5 to about 15 parts by weight of a polyolefin resin;
   (D) about 5 to about 20 parts by weight of a inorganic additive; and
   (E) about 3 to about 15 parts by weight of a polyphenylene ether,
   wherein said thermoplastic elastomer composition has a surface hardness of about 50A (shore A) or less and has an elongation permanent set (100° C.) of about 5 to about 13%.

2. The thermoplastic elastomer composition of claim 1, wherein each of said A and A' blocks comprises an aromatic vinyl polymer and said B block comprises a conjugated diene polymer.

3. The thermoplastic elastomer composition of claim 1, wherein said block terpolymer (A) comprises styrene-ethylene butadiene-styrene (SEBS) block terpolymer, styrene-ethylene propylene-styrene (SEPS) block terpolymer, styrene-isoprene-styrene (SIS) block terpolymer, styrene-ethylene isoprene-styrene block terpolymer, styrene-ethylene ethylene propylene-styrene (SEEPS) block terpolymer, or a combination thereof.

4. The thermoplastic elastomer composition of claim 1, wherein said block terpolymer (A) has a weight average molecular weight of about 140,000 to about 180,000.

5. The thermoplastic elastomer composition of claim 1, wherein said paraffin oil (B) has a kinematic viscosity of about 95 to about 215 cst (40° C. as a reference).

6. The thermoplastic elastomer composition of claim 1, wherein said polyolefin resin (C) has a melt index (230° C., 2.16 kg) of about 11 to about 25 g/10 min.

7. The thermoplastic elastomer composition of claim 1, wherein said polyolefin resin (C) comprises polyethylene, polypropylene, polybutylene, ethylene-propylene copolymer, or a combination thereof.

8. The thermoplastic elastomer composition of claim 1, wherein said inorganic additive (D) has an average particle size of about 0.01 to about 5 μm.

9. The thermoplastic elastomer composition of claim 1, wherein said inorganic additive (D) comprises calcium carbonate, talc, clay, silica, mica, titanium dioxide, carbon black, graphite, wollastonite, nano silver, or a combination thereof.

10. The thermoplastic elastomer composition of claim 1, wherein said polyphenylene ether resin (E) has a weight average molecular weight of about 20,000 to about 40,000.

11. The thermoplastic elastomer composition of claim 1, further comprising an additive comprising an UV absorbent, heat stabilizer, antioxidant, flame retardant, lubricant, colorant, antimicrobial agent or a combination thereof.

12. A molded article comprising the thermoplastic elastomer composition as defined in claim 1.

13. A thermoplastic elastomer comprising:
   (A) a terpolymer comprising styrene-ethylene butadiene-styrene (SEBS) block terpolymer, styrene-ethylene propylene-styrene (SEPS) block terpolymer, styrene-isoprene-styrene (SIS) block terpolymer, styrene-ethylene isoprene-styrene block terpolymer, styrene-ethylene ethylene propylene-styrene (SEEPS) block terpolymer, or a combination thereof;
   (B) a paraffin oil;
   (C) a polyolefin resin comprising polyethylene, polypropylene, polybutylene, ethylene-propylene copolymer, or a combination thereof;
   (D) an inorganic additive comprising calcium carbonate, talc, or a combination thereof; and
   (E) a polyphenylene ether
   wherein said thermoplastic elastomer has a surface hardness of about 50A (shore A) or less.

14. The thermoplastic elastomer of claim 13, wherein said thermoplastic elastomer has a tensile strength (100° C.) of about 14 to about 25 kgf/cm$^2$, an elongation rate (100° C.) of about 430 to about 700%, and an elongation permanent set (100° C.) of about 5 to about 13%.

15. A molded article comprising the thermoplastic elastomer of claim 13.

* * * * *